United States Patent
Yiu et al.

(10) Patent No.: US 11,755,740 B2
(45) Date of Patent: Sep. 12, 2023

(54) SYSTEMS AND METHODS FOR DETECTING AND RECOVERING BIOS CONFIGURATION DEVIATIONS

(71) Applicant: Dell Products L.P., Round Rock, TX (US)

(72) Inventors: Andy Yiu, Austin, TX (US); Qin Ye, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 17/391,614

(22) Filed: Aug. 2, 2021

(65) Prior Publication Data

US 2023/0036868 A1 Feb. 2, 2023

(51) Int. Cl.
*G06F 21/57* (2013.01)
*G06F 21/54* (2013.01)

(52) U.S. Cl.
CPC ............ *G06F 21/572* (2013.01); *G06F 21/54* (2013.01); *G06F 21/575* (2013.01)

(58) Field of Classification Search
CPC .... G06F 21/572; G06F 21/575; G06F 21/577; G06F 21/54; G06F 9/44505; G06F 2221/034; H04L 63/20
See application file for complete search history.

(56) References Cited

U.S. PATENT DOCUMENTS

| | | | | |
|---|---|---|---|---|
| 8,683,598 B1* | 3/2014 | Cashin | ..................... | H04L 63/20 713/188 |
| 10,855,536 B1* | 12/2020 | Blackburn | .......... | H04L 41/0672 |
| 11,150,165 B2* | 10/2021 | Shetty | ................. | G06F 11/3051 |
| 2007/0143827 A1* | 6/2007 | Nicodemus | ........... | H04L 63/102 726/2 |
| 2007/0157051 A1* | 7/2007 | Hernandez | .......... | G06F 11/2289 714/1 |
| 2011/0225275 A1* | 9/2011 | Shah | .................... | H04L 41/0816 709/223 |
| 2011/0246504 A1* | 10/2011 | Slater | ..................... | G06Q 10/00 707/769 |
| 2012/0017073 A1* | 1/2012 | Gillespie | ............. | G06F 9/44505 713/2 |
| 2013/0013753 A1* | 1/2013 | Zessin | .................... | G06F 9/4411 709/221 |
| 2016/0098283 A1* | 4/2016 | Martinez | ............. | G06F 9/44505 713/2 |

(Continued)

OTHER PUBLICATIONS

Cooper, David, et al. "BIOS protection guidelines." NIST Special Publication 800 (2011): 147. (Year: 2011).*

*Primary Examiner* — Michael Simitoski
(74) *Attorney, Agent, or Firm* — Jackson Walker L.L.P (57) ABSTRACT

An information handling system may include a processor, a basic input/output system (BIOS) communicatively coupled to the processor, and a security agent comprising a program of instructions embodied in non-transitory computer-readable media and configured to, when read and executed by the processor: retrieve a BIOS policy, retrieve BIOS configuration information, based on the BIOS policy and the BIOS configuration information, determine a deviation of one or more BIOS attributes of the BIOS configuration information, and perform remediation of the one or more BIOS attributes based on the deviation.

12 Claims, 4 Drawing Sheets

(56) References Cited

U.S. PATENT DOCUMENTS

| | | | |
|---|---|---|---|
| 2016/0162689 A1* | 6/2016 | Martinez | G06F 9/4406 |
| | | | 726/1 |
| 2016/0173525 A1* | 6/2016 | Thomas | H04L 63/145 |
| | | | 726/23 |
| 2017/0032127 A1* | 2/2017 | Ruelas | G06F 9/4411 |
| 2017/0068553 A1* | 3/2017 | Martinez | G06F 9/44505 |
| 2017/0104651 A1* | 4/2017 | Kakadia | H04L 43/04 |
| 2018/0176254 A1* | 6/2018 | Lam | H04L 63/105 |
| 2018/0255099 A1* | 9/2018 | Chen | H04L 63/1416 |
| 2018/0351790 A1* | 12/2018 | Khemani | G06F 3/0653 |
| 2018/0367568 A1* | 12/2018 | Martinez | H04L 63/0272 |
| 2019/0238584 A1* | 8/2019 | Somasundaram | H04L 63/1433 |
| 2019/0294800 A1* | 9/2019 | Andrews | G06F 21/602 |
| 2020/0073656 A1* | 3/2020 | Satapathy | G06F 8/71 |

\* cited by examiner

SYSTEMS AND METHODS FOR DETECTING AND RECOVERING BIOS CONFIGURATION DEVIATIONS

TECHNICAL FIELD

The present disclosure relates in general to information handling systems, and more specifically to systems and methods for detecting and recovering deviations in configuration of an information handling system basic input/output system (BIOS).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The BIOS is the core firmware of an information handling system used to boot an information handling system, and it often the first code that executes when an information handling system powers on and/or resets. Typically, when an information handling system ships from a manufacturer, the manufacturer delivers the information handling system with a BIOS configuration that balances security considerations and user experience.

In some cases, an unauthorized modification, which may be referred to as a BIOS attack, may be made to BIOS code or configuration, in a manner that allows malicious actors to access and compromise an information handling system. Techniques for minimizing or eliminating such vulnerabilities are desired.

SUMMARY

In accordance with the teachings of the present disclosure, the disadvantages and problems associated with existing approaches to BIOS security may be reduced or eliminated.

In accordance with embodiments of the present disclosure, an information handling system may include a processor, a basic input/output system (BIOS) communicatively coupled to the processor, and a security agent comprising a program of instructions embodied in non-transitory computer-readable media and configured to, when read and executed by the processor: retrieve a BIOS policy, retrieve BIOS configuration information, based on the BIOS policy and the BIOS configuration information, determine a deviation of one or more BIOS attributes of the BIOS configuration information, and perform remediation of the one or more BIOS attributes based on the deviation.

In accordance with these and other embodiments of the present disclosure, a method may include retrieving a basic input/output system (BIOS) policy for a BIOS of an information handling system, retrieving BIOS configuration information for the BIOS, based on the BIOS policy and the BIOS configuration information, determining a deviation of one or more BIOS attributes of the BIOS configuration information, and performing remediation of the one or more BIOS attributes based on the deviation.

In accordance with these and other embodiments of the present disclosure, an article of manufacture may include a computer readable medium and computer-executable instructions carried on the computer readable medium, the instructions readable by a processor, the instructions, when read and executed, for causing the processor to: retrieve a basic input/output system (BIOS) policy for a BIOS of an information handling system, retrieve BIOS configuration information for the BIOS, based on the BIOS policy and the BIOS configuration information, determine a deviation of one or more BIOS attributes of the BIOS configuration information, and perform remediation of the one or more BIOS attributes based on the deviation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
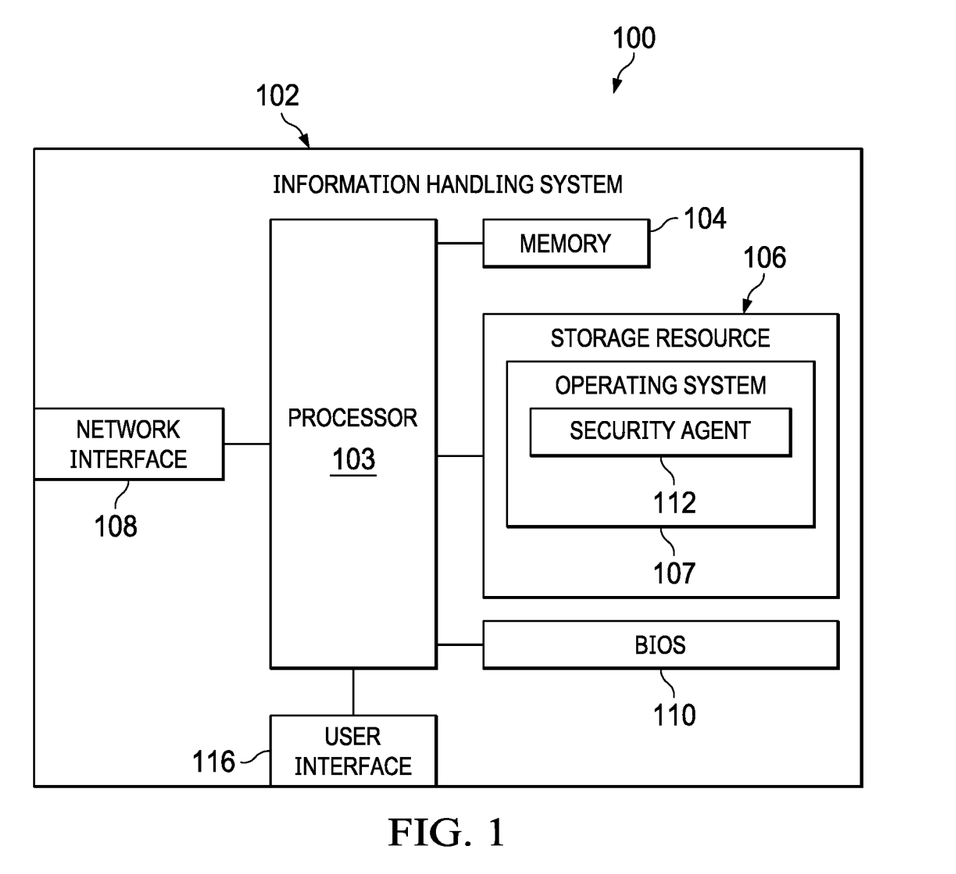
FIG. 1 illustrates a block diagram of an example information handling system, in accordance with certain embodiments of the present disclosure.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer such as a laptop, notebook, or tablet). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102. As shown in FIG. 1, storage resource 106 may have stored thereon an operating system 107.

Operating system 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 107. Active portions of operating system 107 may be transferred from storage resource 106 to memory 104 for execution by processor 103.

As shown in FIG. 1, operating system 107 may include a security agent 112. Security agent 112 may comprise any program of executable instructions, or aggregation of programs of executable instructions, configured to execute on top of or as a component of operating system 107, and may be configured to, as described in greater detail below, enforce a BIOS configuration policy, perform on-device per-attribute risk-based assessment of BIOS configuration in order to detect and recover from deviations to BIOS configuration, and perform autonomous intelligent remediation of BIOS configuration deviations.

Although security agent 112 is shown in FIG. 1 as integral to operating system 107, in some embodiments, security agent 112 may comprise a stand-alone application independent from operating system 107. Further, in some embodiments, security agent 112 may be embodied within BIOS 110.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS)

or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

Figure 2:
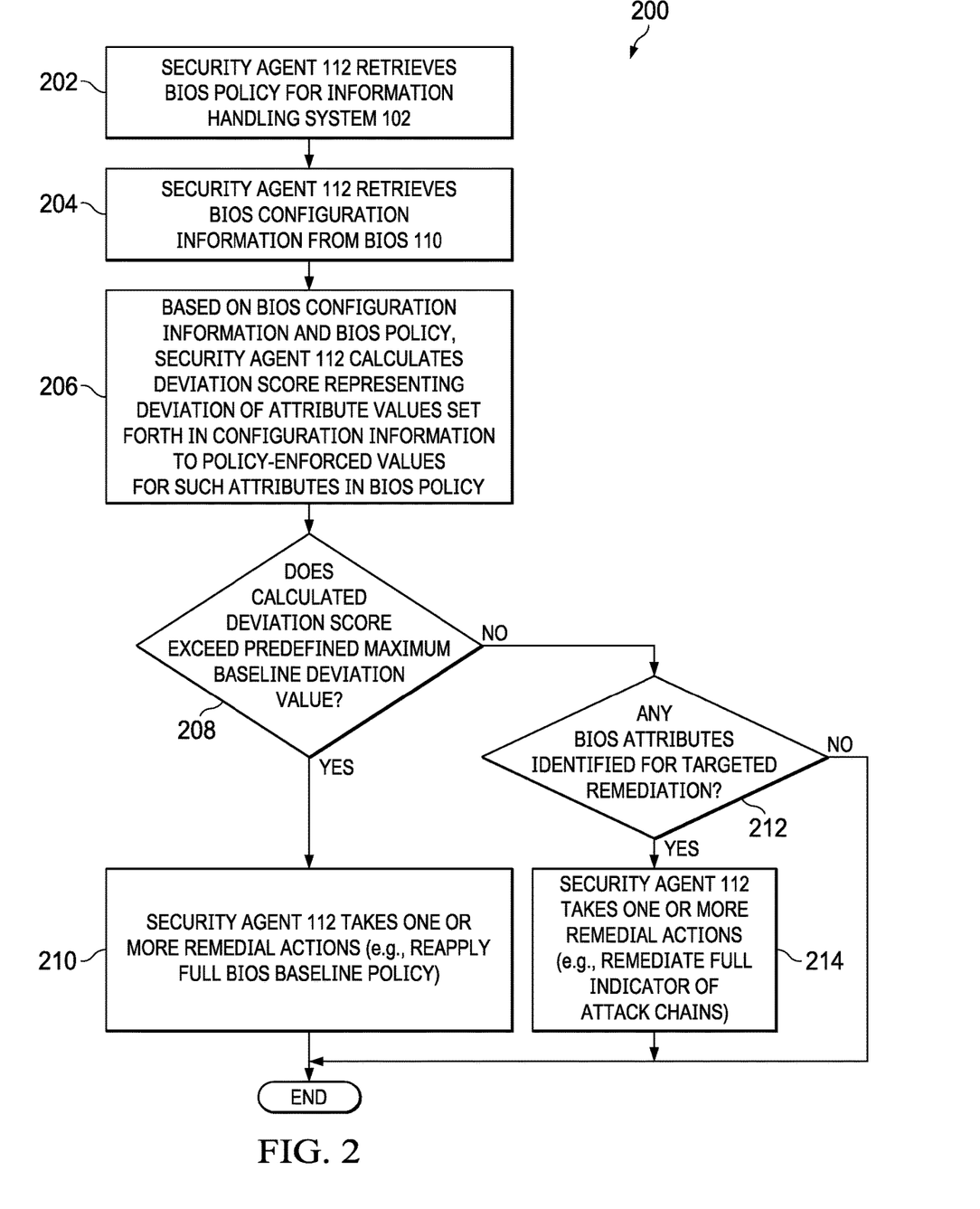
FIG. 2 illustrates a flow chart of an example method for detection and remediation of BIOS configuration deviations, in accordance with certain embodiments of the present disclosure.

FIG. 2 illustrates a flow chart of an example method 200 for detection and remediation of BIOS configuration deviations, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, security agent 112 may retrieve a BIOS policy for information handling system 102. For example, in some embodiments, security agent 112 may be configured to download the BIOS policy via network interface 108 from a network repository. In other embodiments, or if security agent 112 is unable to retrieve the BIOS policy via network interface 108, such BIOS policy may be cached or otherwise stored in computer-readable media of information handling system 102. Such BIOS policy may thus in effect comprise a centralized BIOS policy defined by an administrator of information handling system 102. Such BIOS policy may define, for each BIOS attribute of BIOS configuration for BIOS 110, a default value of such BIOS attribute or a policy-enforced value for such attribute and a BIOS attribute weight (which may be used for a baseline deviation calculation, as described below). The BIOS policy may also define a maximum baseline deviation threshold.

At step 204, security agent 112 may retrieve BIOS configuration information from BIOS 110, such configuration information defining a configuration of a plurality of BIOS attributes of BIOS 110.

At step 206, based on the BIOS configuration information and the BIOS policy, security agent 112 may calculate a deviation score representing a deviation of attribute values set forth in the configuration information to policy-enforced values for such attributes in the BIOS policy. Calculation of such deviation score is described in greater detail below with reference to FIG. 3 and method 300.

At step 208, security agent 112 may determine if the calculated deviation score exceeds a predefined maximum baseline deviation value. The predefined maximum baseline deviation value may be defined by the BIOS policy. If the calculated deviation score exceeds the predefined maximum baseline deviation value, method 200 may proceed to step 210. Otherwise, method 200 may proceed to step 212.

At step 210, in response to the calculated deviation score exceeding the predefined maximum baseline deviation value, security agent 112 may take one or more remedial actions. Such one or more remedial actions may include resetting all attributes of BIOS 110 to default values set forth in the BIOS policy to reapply the full BIOS baseline policy, and causing a restart of information handling system 102 to enforce the resetting of attributes in BIOS 110. In addition or alternatively, the one or more remedial actions may also include communication of a warning to a user or administrator of information handling system 102 regarding the calculated deviation score exceeding the predefined maximum baseline deviation value. After completion of step 210, method 200 may end. However, method 200 may iteratively be performed in accordance with a predefined policy.

At step 212, security agent 112 may analyze a BIOS indicator of attack chains to determine if any BIOS attributes are identified for targeted remediation. Such determination is described in greater detail below with reference to FIG. 4 and method 400. If any BIOS attributes need to be remediated to address security concerns, method 200 may proceed to step 214. Otherwise, method 200 may end. However, method 200 may iteratively be performed in accordance with a predefined policy.

At step 214, in response to any BIOS attributes being identified for targeted remediation, security agent 112 may take one or more remedial actions. Such one or more actions may including targeted remediation of full indicators of attack chains. Such one or more remedial actions may include updating a BIOS attribute determined to have the highest security impact on information handling system 102 to a policy-enforced value or a default value, and causing a restart of information handling system 102 to enforce the change to such attribute. In addition or alternatively, the one or more remedial actions may also include communication of a warning to a user or administrator of information handling system 102 regarding the BIOS attribute requiring remediation. After completion of step 214, method 200 may end. However, method 200 may iteratively be performed in accordance with a predefined policy.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
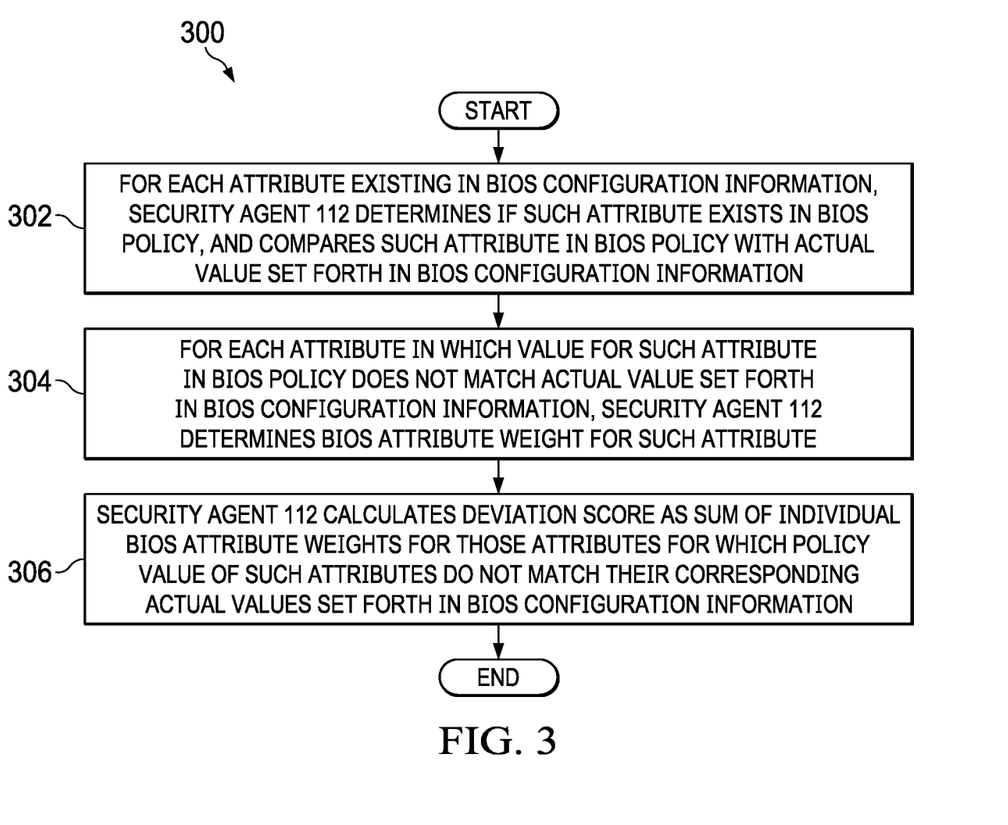
FIG. 3 illustrates a flow chart of an example method for assessment of baseline deviation of a BIOS configuration, in accordance with certain embodiments of the present disclosure.

FIG. 3 illustrates a flow chart of an example method 300 for assessment of baseline deviation of a BIOS configuration, in accordance with certain embodiments of the present disclosure. According to one embodiment, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, for each attribute existing in the BIOS configuration information, security agent 112 may determine if such attribute exists in the BIOS policy. If the attribute exists, the value for such attribute in the BIOS policy may be compared with the actual value set forth in the BIOS configuration information.

At step 304, for each attribute in which value for such attribute in the BIOS policy does not match the actual value set forth in the BIOS configuration information, security agent 112 may determine a BIOS attribute weight for such attribute, which may be defined by the BIOS policy. For example, the higher an attribute weight, the more significant the security impact of an attribute.

At step 306, security agent 112 may calculate a deviation score as the sum of the individual BIOS attribute weights for those attributes for which the policy value of such attributes do not match their corresponding actual values set forth in the BIOS configuration information. After completion of step 306, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
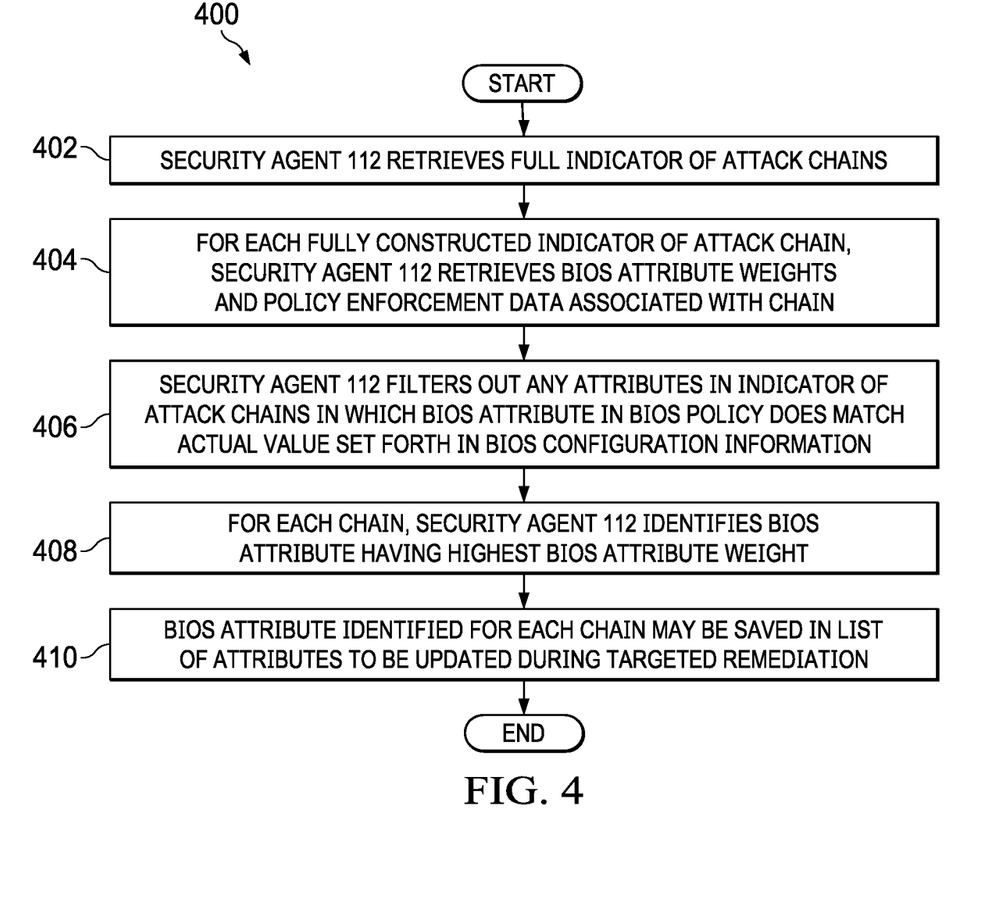
FIG. 4 illustrates a flow chart of an example method for identifying BIOS attributes for targeted remediation, in accordance with certain embodiments of the present disclosure.

FIG. 4 illustrates a flow chart of an example method 400 for identifying BIOS attributes for targeted remediation, in accordance with certain embodiments of the present disclosure. According to one embodiment, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, security agent 112 may retrieve a full indicator of attack chains from Secure Event Log (SEL) data. At step 404, for each fully constructed indicator of attack chain, security agent 112 may retrieve BIOS attribute weights and policy enforcement data associated with the chain. At step 406, security agent 112 may filter out any attributes in the indicator of attack chains in which the BIOS attribute in the BIOS policy matches the actual value set forth in the BIOS configuration information. At step 408, for each chain, security agent 112 may identify the BIOS attribute having the highest BIOS attribute weight. The BIOS attribute with the highest weight may have the highest security impact on information handling system 102. At step 410, the BIOS attribute identified for each chain may be saved in a list of attributes to be updated during targeted remediation. Targeted remediation may then be performed on each attribute in the list of attributes. After completion of step 410, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    a basic input/output system (BIOS) communicatively coupled to the processor; and
    a security agent comprising a program of instructions embodied in non-transitory computer-readable media and configured to, when read and executed by the processor:
        retrieve a BIOS policy;
        retrieve BIOS configuration information;
        based on the BIOS policy and the BIOS configuration information, determine a deviation of one or more BIOS attributes of the BIOS configuration information; and
        perform remediation of the one or more BIOS attributes based on the deviation, wherein determining the deviation comprises:
            detecting a BIOS attack, comprising an unauthorized modification of BIOS code; and
            identifying a particular BIOS attribute in the BIOS attack wherein the particular BIOS attribute comprises a BIOS attribute having the highest attribute weight for which an actual value for the BIOS attribute in the BIOS configuration information is mismatched from a corresponding policy-enforced value in the BIOS policy; and
        wherein performing remediation comprises updating the particular BIOS attribute to a value set forth in the BIOS policy for the BIOS attribute.

2. The information handling system of claim 1, wherein determining the deviation of the one or more BIOS attributes comprises:
    determining whether an actual value for each of the one or more BIOS attributes in the BIOS configuration information is mismatched from a corresponding policy-enforced value in the BIOS policy;
    determining an attribute weight for each of the one or more BIOS attributes for which the actual value is mismatched from the policy-enforced value; and
    calculating a deviation score as a sum of attribute weights for the one or more BIOS attributes for which the actual values are mismatched from the policy-enforced values.

3. The information handling system of claim 2, wherein performing remediation comprises performing the remediation in response to the deviation score exceeding a maximum deviation baseline value.

4. The information handling system of claim 1, wherein performing remediation comprises resetting all BIOS attributes to values set forth in the BIOS policy for the respective one or more BIOS attributes.

5. A method comprising:
    retrieving a basic input/output system (BIOS) policy for a BIOS of an information handling system;
    retrieving BIOS configuration information for the BIOS;
    based on the BIOS policy and the BIOS configuration information, determining a deviation of one or more BIOS attributes of the BIOS configuration information; and
        performing remediation of the one or more BIOS attributes based on the deviation, wherein determining the deviation comprises:
            detecting a BIOS attack, comprising an unauthorized modification of BIOS code; and
            identifying a particular BIOS attribute in the BIOS attack wherein the particular BIOS attribute comprises a BIOS attribute having the highest attribute weight for which an actual value for the BIOS attribute in the BIOS configuration information is mismatched from a corresponding policy-enforced value in the BIOS policy; and
        wherein performing remediation comprises updating the particular BIOS attribute to a value set forth in the BIOS policy for the BIOS attribute.

6. The method of claim 5, wherein determining the deviation of the one or more BIOS attributes comprises:
    determining whether an actual value for each of the one or more BIOS attributes in the BIOS configuration information is mismatched from a corresponding policy-enforced value in the BIOS policy;
    determining an attribute weight for each of the one or more BIOS attributes for which the actual value is mismatched from the policy-enforced value; and
    calculating a deviation score as a sum of attribute weights for the one or more BIOS attributes for which the actual values are mismatched from the policy-enforced values.

7. The method of claim 6, wherein performing remediation comprises performing the remediation in response to the deviation score exceeding a maximum deviation baseline value.

8. The method of claim 5, wherein performing remediation comprises resetting all BIOS attributes to values set forth in the BIOS policy for the respective one or more BIOS attributes.

9. An article of manufacture comprising:
    a non-transitory computer readable medium; and
    computer-executable instructions carried on the computer readable medium, the instructions readable by a processor, the instructions, when read and executed, for causing the processor to:
        retrieve a basic input/output system (BIOS) policy for a BIOS of an information handling system;
        retrieve BIOS configuration information for the BIOS;
        based on the BIOS policy and the BIOS configuration information, determine a deviation of one or more BIOS attributes of the BIOS configuration information; and
        perform remediation of the one or more BIOS attributes based on the deviation, wherein determining the deviation comprises:

detecting a BIOS attack, comprising an unauthorized modification of BIOS code; and identifying a particular BIOS attribute in the BIOS attack wherein the particular BIOS attribute comprises a BIOS attribute having the highest attribute weight for which an actual value for the BIOS attribute in the BIOS configuration information is mismatched from a corresponding policy-enforced value in the BIOS policy; and wherein performing remediation comprises updating the particular BIOS attribute to a value set forth in the BIOS policy for the BIOS attribute.

10. The article of claim 9, wherein determining the deviation of the one or more BIOS attributes comprises:

determining whether an actual value for each of the one or more BIOS attributes in the BIOS configuration information is mismatched from a corresponding policy-enforced value in the BIOS policy;

determining an attribute weight for each of the one or more BIOS attributes for which the actual value is mismatched from the policy-enforced value; and calculating a deviation score as a sum of attribute weights for the one or more BIOS attributes for which the actual values are mismatched from the policy-enforced values.

11. The article of claim 10, wherein performing remediation comprises performing the remediation in response to the deviation score exceeding a maximum deviation baseline value.

12. The article of claim 9, wherein performing remediation comprises resetting all BIOS attributes to values set forth in the BIOS policy for the respective one or more BIOS attributes.

* * * * *